United States Patent [19]
Chambers et al.

[11] Patent Number: 6,012,115
[45] Date of Patent: Jan. 4, 2000

[54] METHOD AND SYSTEM FOR ACCURATE TEMPORAL DETERMINATION OF REAL-TIME EVENTS WITHIN A UNIVERSAL SERIAL BUS SYSTEM

[75] Inventors: Peter Chambers, Phoenix; Lonnie Goff, Tempe; David R. Evoy, Tempe; Mark Eidson, Tempe, all of Ariz.

[73] Assignee: VLSI Technology, Inc., San Jose, Calif.

[21] Appl. No.: 08/901,465

[22] Filed: Jul. 28, 1997

[51] Int. Cl.[7] .................................................. G06F 13/00
[52] U.S. Cl. .......................................... 710/105; 710/100
[58] Field of Search ................................... 710/100–106; 713/400–601

[56] References Cited

U.S. PATENT DOCUMENTS

| | | | |
|---|---|---|---|
| 4,531,826 | 7/1985 | Stoughton et al. | 399/80 |
| 5,027,297 | 6/1991 | Garitty et al. | 702/187 |
| 5,581,669 | 12/1996 | Voth | 395/113 |
| 5,778,218 | 7/1998 | Gulick | 713/503 |
| 5,826,101 | 10/1998 | Beck et al. | 712/34 |
| 5,913,071 | 6/1999 | Macomber | 712/40 |

OTHER PUBLICATIONS

USB Specification, Version 1.0 Jan. 19, 1996.

*Primary Examiner*—Ayaz R. Sheikh
*Assistant Examiner*—David A. Wiley
*Attorney, Agent, or Firm*—Wagner, Murabito & Hao LLP

[57] ABSTRACT

A method and system that enables real-time peripheral devices to be connected to a computer system utilizing Universal Serial Bus architecture. The present invention empowers the computer system to perform an accurate determination of the moment in time a predetermined event occurred within a real-time peripheral device by utilizing the start of frame pulse transmitted from a USB host controller to peripheral devices connected to it. When a predetermined event occurs within a peripheral device, a first timer within the peripheral device starts incrementing to determine the amount of time that elapses until the next start of frame occurs. Once the next start of frame occurs, the first timer stops incrementing and stores the time before start of frame value. Every start of frame pulse causes a second timer located within the USB host controller to start incrementing. The USB host controller interrogates the peripheral device which transfers data to the host controller indicating that (1) an event occurred and (2) the time before start of frame value of the first timer. The USB host controller interrupts the host processor and transfers it the data related to the peripheral device. The processor retrieves the time after start of frame value from the second timer and sums it with the time before start of frame value of the first timer resulting in the time after event value, which is the elapsed time since the predetermined event occurred and the processor read the second timer.

19 Claims, 7 Drawing Sheets

METHOD AND SYSTEM FOR ACCURATE TEMPORAL DETERMINATION OF REAL-TIME EVENTS WITHIN A UNIVERSAL SERIAL BUS SYSTEM

TECHNICAL FIELD

The present invention relates to the field of computer systems that implement a Universal Serial Bus (USB). More specifically, the present invention relates to accurately determining the specific time of an occurrence of a real-time event that is monitored by a peripheral device coupled to a Universal Serial Bus.

BACKGROUND ART

Within the field of computer systems, computer peripheral devices (e.g., keyboard, display screen, lightpen, mouse, printer, speakers, scanner, etc.) are coupled to a computer system to enable the host processor to control and communicate with these peripheral devices. The Universal Serial Bus architecture is one type of mechanism used within the computer industry to couple peripheral devices to a computer system. The Universal Serial Bus architecture was developed to be a simple and cost-effective and standardized alternative to previously used peripheral buses or interfaces.

The Universal Serial Bus (USB) architecture is different from other types of peripheral buses (e.g., peripheral component interconnect or PCI bus). One of the main differences between the Universal Serial Bus architecture and other types of peripheral bus architectures is that the USB architecture does not allow all the peripheral devices to be coupled to the same peripheral bus lines. Instead, the USB architecture is a point to point interface so that only one device, the USB host controller, is actually coupled to the Universal Serial Bus. Peripherals then communicate with the USB host controller. The USB architecture utilizes a hierarchical structure which involves the use of hubs or ports to provide a separate USB interface for each peripheral device. A hub is an intermediate routing center of multiple USB ports to which peripheral devices can be coupled.

The Universal Serial Bus architecture is a low cost interface that is likely to become ubiquitous and is suitable for connecting low-cost, low transfer rate peripheral devices to a computer system, but it has a major disadvantage associated with it. The main disadvantage associated with the USB architecture is that it does not have any real-time capability, which is defined as the ability to accurately determine the actual time of an event's occurrence relative to the computer system clock. One of the main reasons that the USB architecture does not have any real-time capability is that it polls the peripheral devices coupled to it instead of allowing the peripheral devices to directly interrupt the host processor of the computer system. Another reason the USB architecture does not have any real-time capability is that no precise timing information is communicated across the USB interface. Furthermore, the lack of any real-time capability within the USB architecture is also attributed to the fact that the 1 ms USB frames are asynchronous and completely indeterminate to the host processor of the computer system. So the USB architecture precludes the accurate determination of the specific instant in time that an event occurred within a peripheral device.

The inability for USB architecture to provide real-time capability precludes the use of certain types of peripheral devices with computer systems that utilizes USB architecture. For example, a lightpen device used in conjunction with a computer-aided design (CAD) program requires real-time capability to operate properly. Therefore, a lightpen cannot operate properly coupled to a prior art computer system that employs the USB architecture.

Another type of device, that is closely related to a lightpen, that cannot operate properly coupled to USB architecture is an aiming device used in conjunction with a software game in which the game player aims and shoots at targets on the display screen and the game responds in some suitable manner.

Therefore, it would be advantageous to provide a method and system that allows the USB architecture to have real-time capability in determining the actual time of an event's occurrence within a peripheral device that communicates with the host processor via the USB architecture. The present invention provides this advantage.

DISCLOSURE OF THE INVENTION

The present invention includes a method and system that enables real-time peripheral devices to be connected to a computer system utilizing Universal Serial Bus (USB) architecture. The present invention provides this capability by empowering the computer system to perform an accurate determination of the moment in time, within a given accuracy, that a predetermined event occurred within a real-time peripheral device. A lightpen or aiming device is an example of the type of real-time peripheral devices that the present invention enables to be connected to a computer system utilizing USB architecture.

Specifically, the present invention method and system utilizes the start of frame pulse that is transmitted from a USB host controller to all the peripheral devices connected to it to allow a host processor to determine the specific moment in time that a specific event occurred within a real-time peripheral device. When a predetermined event occurs within a real-time peripheral device, it performs a predetermined response. Once this predetermined response occurs, a first timer located within the real-time peripheral device starts incrementing to determine the amount of time that elapses until the next start of frame pulse occurs. Once the next start of frame pulse occurs, the first timer within the real-time peripheral device stops incrementing and stores that time value. The time value stored within the first timer, referred to as the time before start of frame value, represents the time that elapsed between the occurrence of the event within the real-time peripheral device and the occurrence of the "next start of frame pulse."

The occurrence of the "next start of frame pulse" also causes a second timer located within a USB host controller to start incrementing. At some time after the "next start of frame pulse" the USB host controller interrogates the real-time peripheral device which transfers data to the host controller indicating that (1) an event occurred and (2) the time before start of frame value of the first timer. The USB host controller interrupts the host processor of the computer system and transfers it the data related to the peripheral device. The host processor reads the current time value of the second timer located within the USB host controller. The second timer value, referred to as the time after start of frame, represents the time that has elapsed between the occurrence of the last start of frame pulse (e.g., "next start of frame pulse") and when the processor read the second timer. The host processor then sums the time before start of frame value with the time after next start of frame value which results in the time after event value. The time after event value (X) is the specific amount of time that has elapsed since the predetermined event occurred within the real-time peripheral device, within a given accuracy, and the time when the host processor sampled the second timer. The host processor knows the actual time (Y) when the second timer was sampled, so the event happened X time units since Y.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

In the following detailed description of the present invention, a method and system for accurate temporal determination of real-time events within the Universal Serial Bus system, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
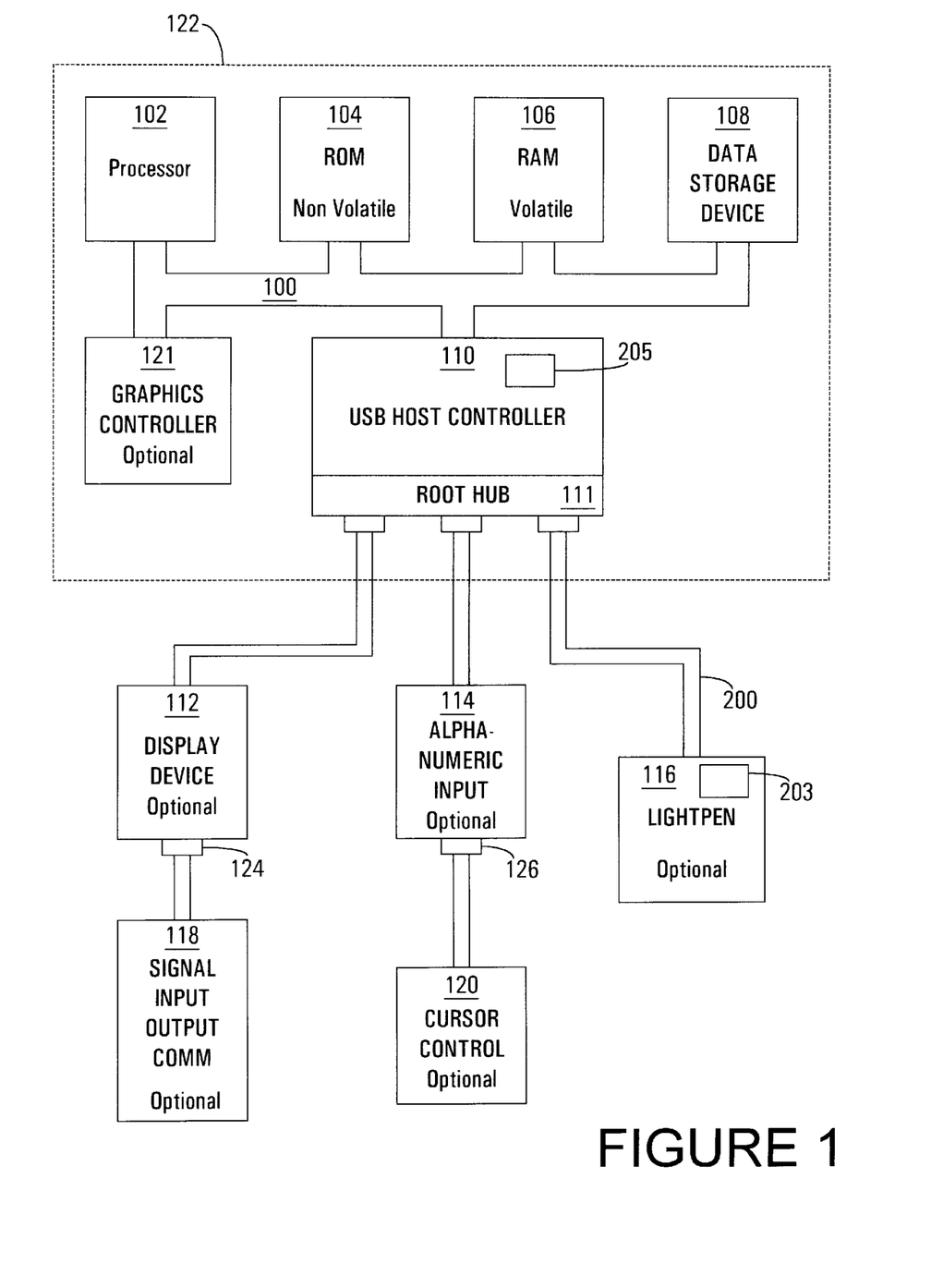
FIG. 1 is a block diagram of a computer system utilizing the Universal Serial Bus architecture that can be used in accordance with the present invention.

Refer to FIG. 1 which illustrates a computer system 122. Within the following discussions of the present invention, certain processes (e.g., processes 400 and 500) and steps are discussed that are realized, in one embodiment, as a series of instructions (e.g., software program) that reside within computer readable memory units of system 122 and executed by processors of system 122. When executed, the instructions cause the computer system 122 to perform specific actions and exhibit specific behavior which is described in detail to follow.

With reference to FIG. 1, a block diagram is shown of a computer system 122 utilizing Universal Serial Bus (USB) architecture used in accordance with the present invention. In general, computer system 122 used by an embodiment of the present invention comprises an address/data bus 100 for communicating information, one or more host processors 102 coupled with bus 100 for processing information and instructions, a computer readable volatile memory unit 106 (e.g. random access memory unit, static RAM, dynamic RAM, etc.) coupled with bus 100 for storing information and instructions for the host processor 102, a computer readable non-volatile memory unit 104 (e.g., read only memory unit, programmable ROM, flash memory, EPROM, EEPROM, etc.) coupled with bus 100 for storing static information and instructions for the host processor 102, a computer readable data storage device 108 such as a magnetic or optical disk and disk drive (e.g., hard drive or floppy diskette) coupled with bus 100 for storing information and instructions, a USB host controller 110 coupled to bus 100 to provide an interface to control all the peripheral devices connected to root hub 111, a timer or counter register 205 located within the USB host controller which accounts for the time that elapses after each USB start of frame pulse is transmitted by the USB host controller 110, and a root hub 111 coupled to USB host controller 110 to provide connection ports to couple peripheral devices to computer system 122.

The USB host controller 110 is coupled to a hub of multiple USB ports, referred to as the root hub 111. This hub is referred to as the root hub because it is the first level of hubs within the USB architecture. Each peripheral device (e.g., display device 112) can also act as a hub by providing multiple USB ports (e.g., USB hub 124) to which other peripheral devices can couple. By coupling a multitude of peripheral devices to a multitude of peripheral devices that have hubs, a total of 127 peripheral devices can be attached to a single USB host controller 110.

The USB host controller 110 is the main component of the Universal Serial Bus architecture because it initiates all of the USB transactions. The USB host controller 110 acts as a peripheral component interconnect (PCI) agent and it is a master on the PCI bus. Within the USB architecture, the peripheral devices do not have the ability to initiate any sort of transaction over the USB. In other words, there is no interrupt mechanism within the USB architecture that allows a peripheral device to request service from the USB host controller 110. Instead, the USB architecture is completely polled. Polling is the act of the USB host controller 110 interrogating the peripheral devices to determine which peripheral devices desire to perform transactions over the USB. The operation of the USB host controller 110 is based on tables that are built into the computer system memory (e.g., RAM 106). These tables contain specific commands which the USB host controller 110 interrogates. In response to these commands, the USB host controller 110 initiates peripheral transactions across the Universal Serial Bus.

As part of the implementation of this polling operation, the USB architecture is based on a series of frames, which occur every millisecond (ms), that are transmitted from the host controller 110 to the peripheral devices (e.g., display device 112, alphanumeric input device 114, lightpen device 116, signal generating device 118, cursor control device 120, etc.). During these 1 ms frames, the USB host controller 110 interrogates specific peripheral devices to determine their status, whether or not they have anything to transfer, or whether or not they need to do anything, etc., by transmitting commands over the Universal Serial Bus. Every peripheral device can be interrogated, or polled, by the host controller 110 during each 1 ms frame, but whether they are polled usually depends on the functionality of the peripheral device. There are some peripheral devices that are very slow and would not need to be interrogated by the host controller 110 each frame.

Optionally, computer system 122 can include a display device 112 coupled to the root hub 111 for displaying information to the computer user, a USB port 124 coupled to display device 112 to enable other peripheral devices to be connected to the root hub 111, an alphanumeric input device 114 including alphanumeric and function keys coupled to the USB host controller 110 for communicating information and command selections to the host processor 102, a USB hub 126 couple to alphanumeric input device 114 to enable other peripheral devices to be connected to the root hub 111, a cursor control device 120 coupled to the USB hub 126 for communicating user information and command selections to the host processor 102 through the USB host controller 110, a signal generating device 118 coupled to the USB hub 124 for communicating command selections to the host processor 102 through the USB host controller 110, a lightpen device 116 coupled to the USB host controller 110 for communicating user information relating to images displayed on display device 112 to the host processor 102, and a timer or counter register 203 located within lightpen 116 which accounts for the time that elapses after lightpen 116 detects a light pulse and the next start of frame pulse transmitted by the USB host controller 110.

Figure 2:
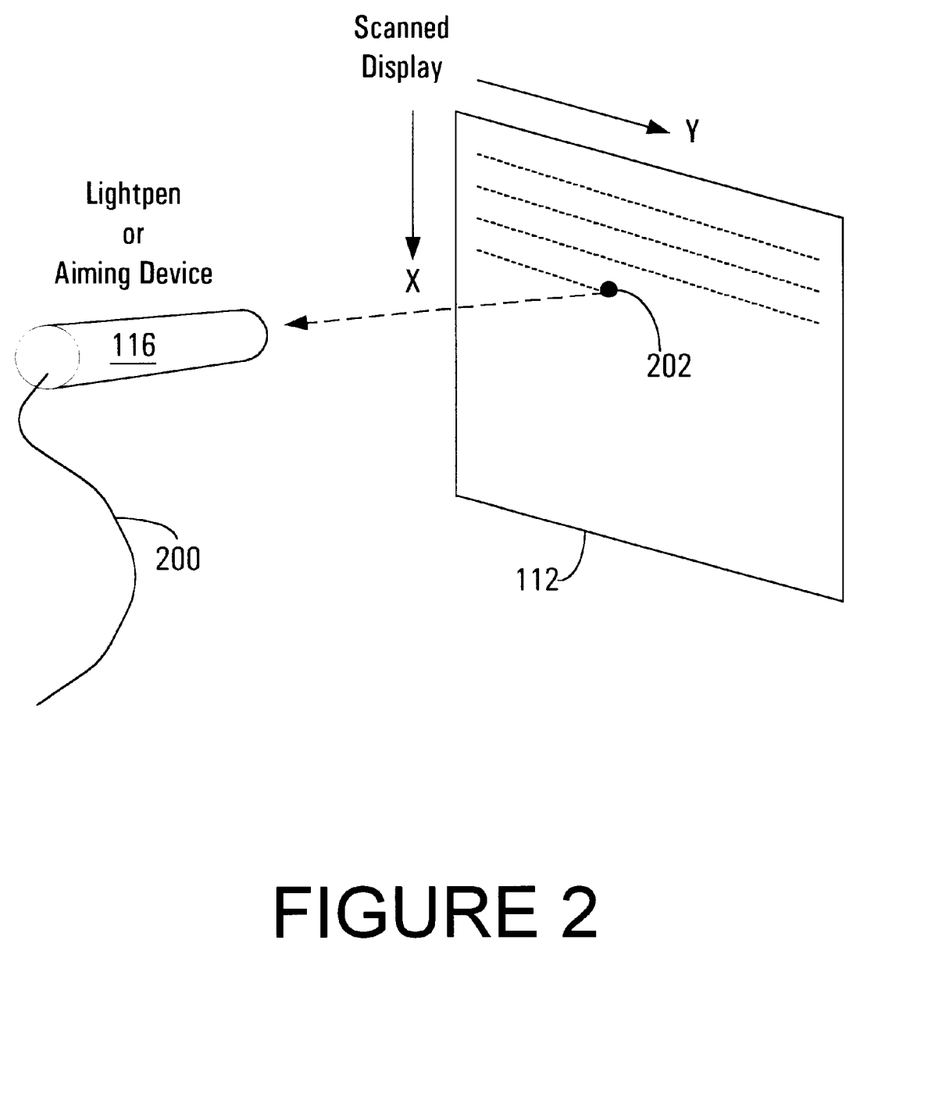
FIG. 2 shows a lightpen device and display screen that are used in accordance with one embodiment of the present invention.

Lightpen 116 of FIG. 2 works in conjunction with a display screen 112. The function of the lightpen 116 is closely related to the operation of the display screen 112. The average cathode ray tube display screen 112 is a scanned display where an electron beam 202 tracks horizontal lines across the phosphor of the display screen 112 and leaves behind it a bright dot. The electron beam 202 scans across the display screen 112 with a particular refresh rate (e.g., a computer screen is between 60–75 Hz) to display a sustained image on the screen 112. The lightpen 116 is able to detect when the scanning beam 202 is directly underneath it because the lightpen or aiming device 116 has a photoreceptor (e.g., photo sensitive diode) that detects the occurrence of the pulse of light caused by the scanning beam 202 when it is directly in front of the lightpen 116. When the lightpen 116 detects the scan beam 202, the (x, y) position of the scan beam 202 at that moment in time directly corresponds to where the lightpen 116 is located in relation to the display screen 112.

The present invention enables real-time peripheral devices to be connected to a computer system utilizing Universal Serial Bus (USB) architecture. The present invention provides this capability by empowering the computer system to perform an accurate determination of the moment in time, within a given accuracy, that an event occurred within a real-time peripheral device. Lightpen 116 of FIG. 2 is an example of the type of real-time peripheral devices that the present invention enables to be connected to a computer system utilizing USB architecture.

Figure 3A:
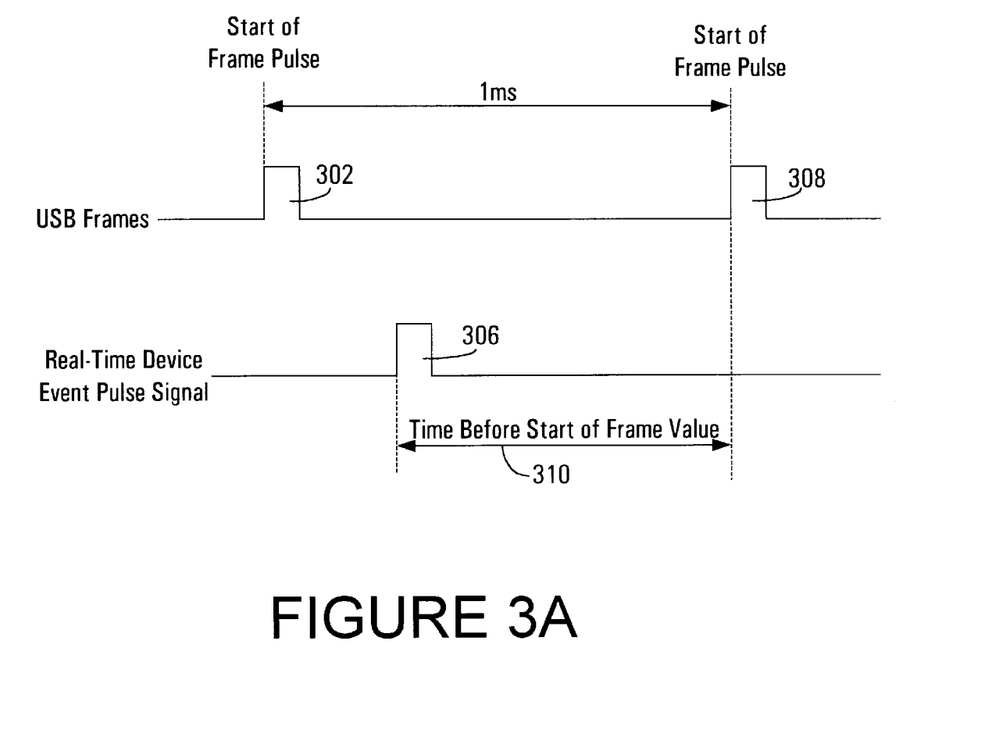
FIG. 3A is a timing diagram showing the amount of time that has expired since a real-time peripheral device pulse was asserted with respect to the next start of frame of the Universal Serial Bus as determined within the real-time peripheral device.

The operations of the USB architecture are based on frames that occur every millisecond (ms) as represented in FIG. 3A. These USB frames are created by start of frame pulses 302 and 308 which are generated by the USB host controller 110 of FIG. 1 and transferred to the peripheral devices connected to it. Each peripheral device sees the start of frame pulse. The start of frame pulse is used by the present invention as a common timing reference. The operation of the present invention is described with reference to FIGS. 3A–3C in conjunction with FIGS. 1 and 2.

Within one embodiment of the present invention, a real-time peripheral device (e.g., lightpen 116 of FIG. 2) is connected to USB host controller 110 of FIG. 1 by a transmission line (e.g., transmission line 200). Once a predetermined event occurs within the real-time peripheral device, a predetermined response is performed within the real-time peripheral device. For example, if lightpen 116 of FIG. 2 detects scanning beam 202 directly underneath it, it asserts an electric pulse within its internal circuitry. Real-time peripheral device event pulse signal 306 of FIG. 3A represents a predetermined response performed within the peripheral device. Once the event pulse 306 is asserted within the peripheral device (e.g., lightpen 116), it causes a timer 203 (FIG. 1) or counter register contained within the peripheral device to start incrementing. Within the present invention, one embodiment of counter register 203 located within the peripheral device is a 16-bit register with a resolution of 100 nanoseconds (ns). The counter register 203 is used to calculate the amount of time that elapses between the occurrence of event pulse 306 and the next start of frame pulse 308.

Counter register 203 of FIG. 1 stops incrementing when the next start of frame pulse 308 of FIG. 3A is received by the peripheral device (e.g., lightpen 116). The time value stored within the counter register 203 is referred to as the time before start of frame value and represents period 310. The occurrence of the next start of frame pulse 308 also causes a second timer or counter register 205 of FIG. 1 located within USB host controller 110 to begin incrementing. Within the present invention, one embodiment of counter register 205 located within the USB host controller 110 is a 16-bit register with a resolution of 100 ns. The counter register 205 is reset to zero at the occurrence of each start of frame pulse transmitted by the USB host controller 110.

Figure 3B:
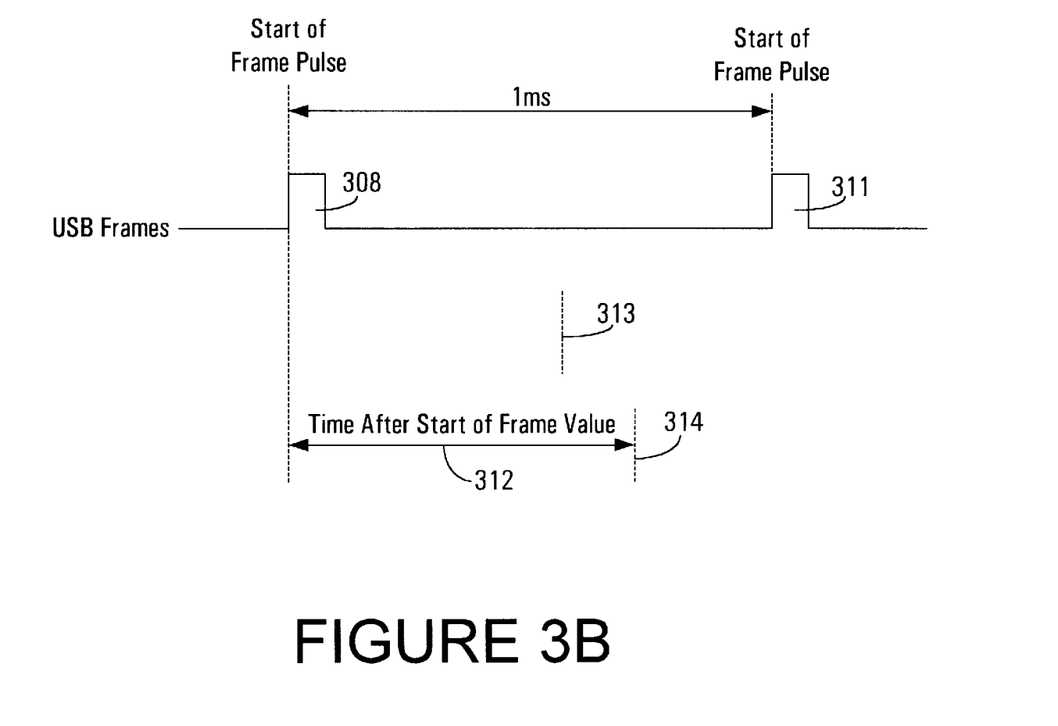
FIG. 3B is a timing diagram showing the amount of time that has expired with respect to the start of frame of the Universal Serial Bus as determined within the USB host controller.

Within FIG. 3B, dashed line 313 represents the moment in time that USB host controller 110 (FIG. 1) polls and interrogates the peripheral device (e.g., lightpen 116) to determine if an event occurred related to that peripheral device within the last 1 ms frame. When interrogated by USB host controller 110 at dashed line 313, the peripheral device (e.g., lightpen 116) transmits data to the USB host controller 110 indicating that (1) event pulse 306 (FIG. 3A) occurred and (2) the counter register 203 value representing the time before start of frame value 310. Upon receiving this data from the peripheral device, the USB host controller 110 of FIG. 1 interrupts host processor 102 over bus 100 and then transfers it the data related to the event that occurred within the peripheral device. Once host processor 102 receives the transmitted data related to the peripheral device (e.g., lightpen 116), it is instructed to retrieve the count value from the counter register 205 located within USB host controller 110. Before the occurrence of start of frame pulse 311, dashed line 314 represents the moment in time that host processor 102 retrieves the timer value from counter 205 of the USB host controller 110, which measures the time after start of frame value 312. The time after start of frame value 312 represents the amount of time that elapsed between the occurrence of the last generated start of frame pulse, start of frame pulse 308, and the moment host processor 102 read the counter register 205 located within the USB host controller 110.

Figure 3C:
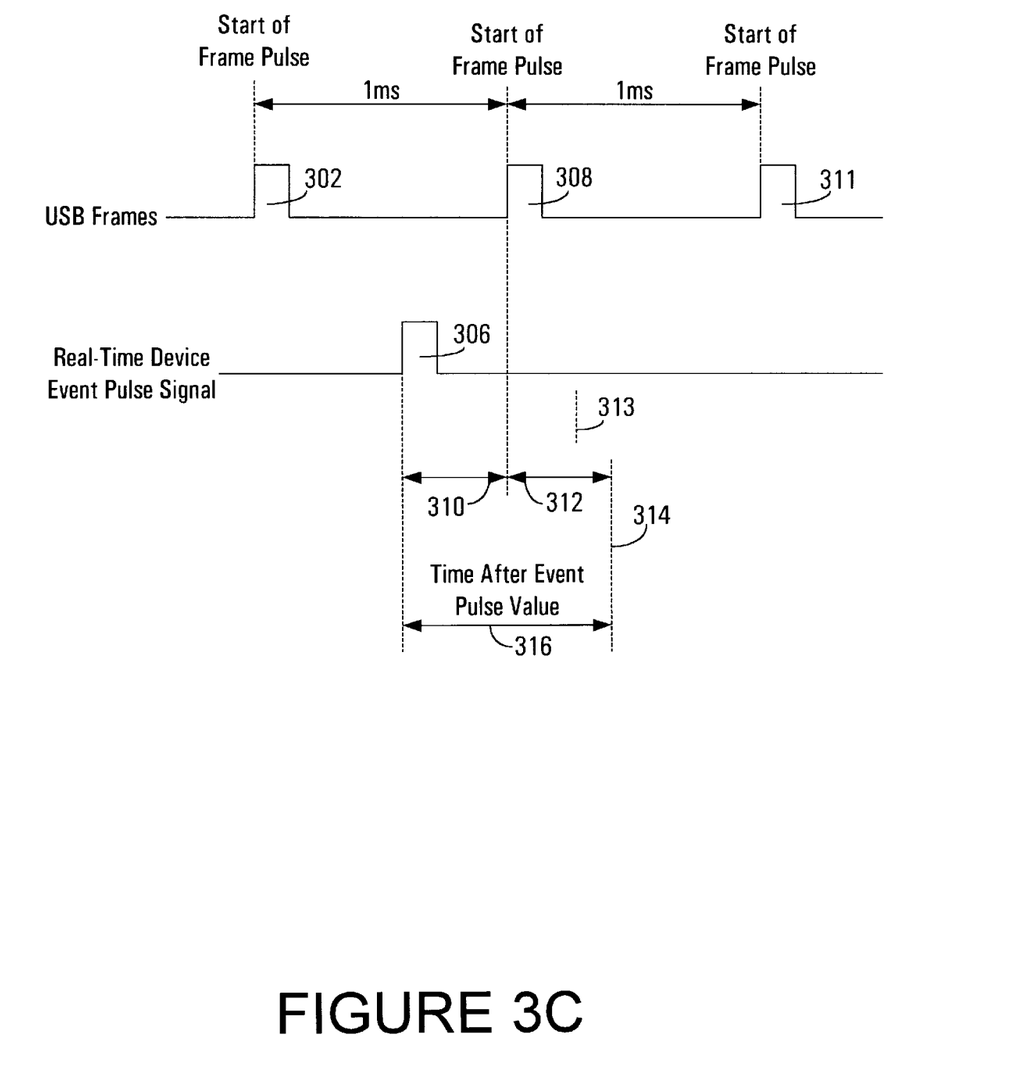
FIG. 3C is a timing diagram overview showing the total amount of time that has expired since the real-time peripheral device coupled to the Universal Serial Bus asserted a pulse.

Referring to FIG. 3C, once host processor 102 of FIG. 1 has acquired the time after start of frame value 312 and the time before start of frame value 310, it is directed to sum these two values together. By summing these two values, host processor 102 is able to determine the total amount of time that has elapsed between the occurrence of event pulse 306 and time reference 314, which is referred to as the time after event pulse value 316. Knowing the time at point 314, host processor 102 can subtract the time after event pulse value 316 to determine the precise instant in time, within a given accuracy, when a real-time event 306 occurred within a real-time peripheral device coupled to computer system 122 utilizing the Universal Serial Bus architecture.

For the present invention to enable a lightpen 116 of FIG. 2 to operate correctly while connected to computer system 122 of FIG. 1, all the procedural steps discussed above are used together with further procedural steps. For example, at the same time host processor 102 of FIG. 1 reads the time after start of frame value 312, indicated by dashed line 314 of FIG. 3C, the (x, y) position of scanning beam 202 of FIG. 2 is stored within special registers located within the graphics controller 121 of computer system 122. Host processor 102 knows the specific characteristics of display device 112 (e.g., the flyback period, the refresh rate, and the horizontal and vertical resolution). Host processor 102 is directed to use the stored (x, y) position of scanning beam 202 and the time after event pulse value 316 to extrapolate back in time to determine where scanning beam 202 was previously positioned on display screen 112 when event pulse 306 occurred. Once the previous position of scanning beam 202 is determined in relation to display screen 112, within a certain accuracy, that position directly corresponds to the position of lightpen 116 when it detected scanning beam 202 and asserted event pulse 306. The (x, y) position corresponding to where the lightpen 116 was asserted is then transferred to the lightpen software application of computer system 122 which determines the proper response to the position of lightpen 116.

Figure 4:
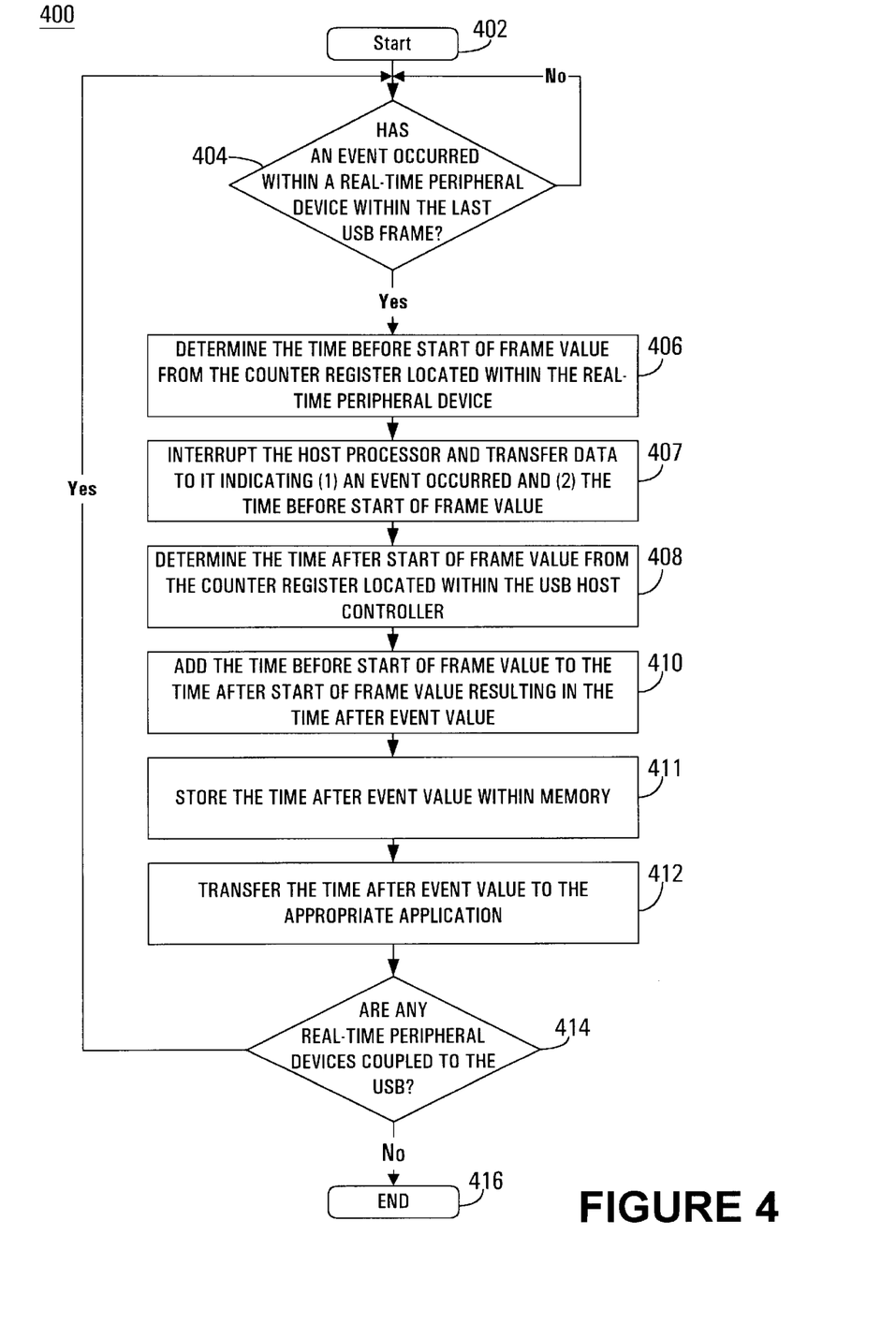
FIG. 4 shows a flowchart of an embodiment of the present invention for determining the amount of time that has expired since an event occurred within a real-time peripheral device coupled to a Universal Serial Bus.

FIG. 4 shows a flowchart of a method 400 of the present invention for determining the moment in time that an event occurred within a real-time peripheral device connected to a computer system 122 utilizing the Universal Serial Bus architecture. Process 400 executes once every 1 ms. FIG. 4 contains process 400 which starts at step 402. Step 404 directs the USB host controller 110 (FIG. 1) of the computer system 122 to interrogate a real-time peripheral device coupled to it to determine whether a predetermined event occurred within it during the last USB frame. If a predetermined event did not occur based on the response of the real-time peripheral device, USB host controller 110 is directed to return to the beginning of step 404 to check other real-time peripheral devices. If a predetermined event did occur based on the response of the real-time peripheral device, USB host controller 110 is directed to proceed to step 406. Step 406 directs USB host controller 110 to determine the time before start of frame value 310 (FIG. 3C) from the timer (e.g., counter register 203) located within the real-time peripheral device. USB host controller 110 determines the time before start of frame value 310 by receiving it from the real-time peripheral device.

Once step 406 is completed, step 407 of FIG. 4 directs USB host controller 110 to interrupt the host processor 102 of computer system 122 and transfers data to it indicating that (1) a predetermined event occurred within the real-time peripheral device and (2) the time before start of frame value 310. Step 408 directs the host processor 102 to read or sample the current value of counter register 205 located within USB host controller 110, which represents the time after start of frame value 312. Step 410 directs the host processor 102 to add together the time before start of frame value 310 and the time after start of frame value 312 which results in the time after event value 316.

Once step 410 is completed, step 411 directs the host processor 102 to store the time after event value 316 within memory (e.g., RAM 106). Step 412 directs the host processor 102 to transfer the time after event value 316 to the appropriate software application of computer system 122 so that the proper response can be performed. Step 414 directs the USB host controller 110 to determine if any real-time peripheral devices are coupled to the USB. If any real-time peripheral devices are coupled to the USB, step 414 directs host processor 102 to return to step 404. If there are not any real-time peripheral devices coupled to the USB, the computer system 122 exits process 400 at step 416.

Figure 5:
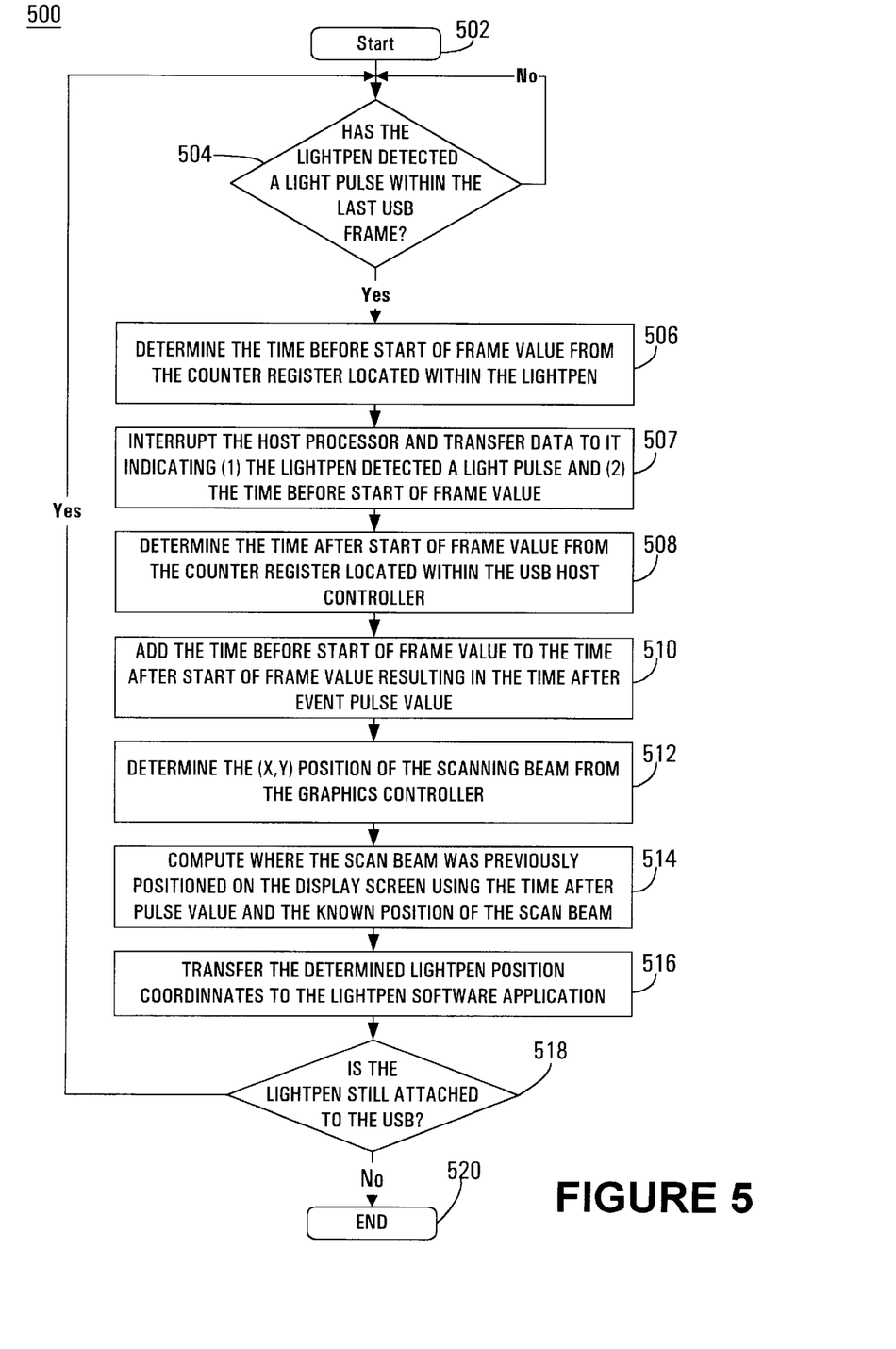
FIG. 5 shows a flowchart of an embodiment of the present invention for determining the amount of time that has expired since a lightpen coupled to a Universal Serial Bus asserted a pulse to determine where the lightpen was located when it asserted its pulse.

FIG. 5 shows a flowchart of a method 500 of the present invention for determining the position of a lightpen device 116 when it is asserted in relation to an (x, y) coordinate of display screen 112. Process 500 executes every 1 ms. FIG. 5 contains process 500 which starts at step 502. Step 504 directs the USB host controller 110 of the USB computer system 122 to determine whether the lightpen device 116 has detected a light pulse emitted from scanning beam 202 of display screen 112 within the last USB frame. If a light pulse was not detected based on the response of the lightpen 116, the USB host controller 110 is directed to return to the beginning of step 504. If a light pulse was detected based on the response of the lightpen 116, the USB host controller 110 is directed to proceed to step 506. Step 506 directs the USB host controller 110 to determine the time before start of frame value 310 from the counter register 203 located within the lightpen 116. The USB host controller 110 determines the time before start of frame value 310 by receiving it from the lightpen 116.

Once step 506 is completed, step 507 of FIG. 5 directs USB host controller 110 to interrupt the host processor 102 of computer system 122 and transfer data to it indicating that (1) the lightpen detected a light pulse and (2) the time before start of frame value 310. Step 508 directs the host processor 102 to determine the time after start of frame value 312 from counter register 205, located within the USB host controller 110. The host processor 102 determines the time after start of frame value 312 by retrieving it from the counter register 205. Step 510 directs the host processor 102 to add together the time before start of frame value 310 and the time after start of frame value 312 which results in the time after event pulse value 316.

Once step 510 is completed, step 512 of FIG. 5 directs the host processor 102 to determine the (x, y) position of the scanning beam 202 of the display screen 112 by accessing special registers located within the graphics controller 121 of computer system 122. The (x, y) position of the scanning beam 202 is stored by graphics controller 121 when the host processor 102 retrieved the time after start of frame value 312 from the counter register 205 at reference point 314. Step 514 directs the host processor 102 to compute where the scanning beam 202 was previously located on the display screen 112 using the time after pulse value 316 and the known (x, y) position of the scanning beam 202 which was stored at reference point 314. The previous position of the scanning beam 202 directly corresponds to the position of the lightpen 116 in relation to the display screen 112 when the lightpen 116 detected a light pulse from the scanning beam 202 and asserted event pulse 306.

Once step 514 is completed, step 516 of FIG. 5 directs the host processor 102 to transfer the determined (x, y) position coordinates of lightpen 116 to the lightpen software application of computer system 122 so that the proper response can be performed. Step 518 directs the USB host controller 110 to determine if the lightpen 116 is coupled to the USB (e.g., check if the lightpen 116 is disconnected). If the lightpen 116 is coupled to the USB, step 518 directs the host processor 102 to return to step 504. If the lightpen 116 is not coupled to the USB, the computer system 122 exits process 500 at step 520.

There are at least two ways to improve the accuracy of the present invention in determining the specific instant in time that an event occurred within a real-time peripheral device connected to a computer system utilizing the Universal Serial Bus architecture. One way to improve the accuracy of the present invention is to increase the resolution of the counter register 205 used within the USB host controller 110 and the counter register (e.g., counter register 203) used within a real-time peripheral device (e.g., lightpen 116). But there is a functional limit to how much the resolution can be increased and still improved the accuracy of the present invention. This functional limit is imposed by inherent inaccuracies associated with the standardized specifications of the USB architecture.

For instance, the inaccuracy within the present invention is caused by the fact that the same start of frame pulse (e.g., start of frame pulse 308) is used to measure time by the counter register 205 located with the USB host controller 110 and the counter register (e.g., counter register 203) located within a real-time peripheral device (e.g., lightpen 116). The problem is that the start of frame pulse is not actually received by both counter registers at the same time. Instead, there is some delay associated with the transmission of the start of frame pulse from the USB host controller 110 and the reception of it by the counter register (e.g., counter register 203) located within the real-time peripheral device (e.g. lightpen 116). This delay in reception of the start of frame pulse is related to the fact that the USB architecture is a fairly slow interface. In one embodiment, the USB architecture is a 12 megabit per second interface with about 80 nanoseconds bit periods that can have relatively poor rise and fall times. Therefore, increasing the resolution of the counter register 205 located within the USB host controller 110 and a real-time peripheral device will increase the accuracy of the present invention, but the increase in accuracy is limited by the specifications of the USB architecture.

Another way to improve the accuracy of the present invention is to include within the time after event value 316 an estimate of the time that the start of frame pulse takes to propagate from the USB host controller 110 to the real-time peripheral device (e.g. lightpen 116). In other words, the addition of an estimate of the propagation time is an attempt to compensate for the propagation inaccuracy. The compensation for the propagation inaccuracy is not recommended unless a real-time peripheral device is not directly connected to the root hub 111 of the USB host controller 110. As part of the preferred embodiment of the present invention, it is suggested that a real-time peripheral device (e.g., lightpen 116) be directly connected to the root hub 111 of the USB host controller 110. This is suggested because USB hubs (e.g., hub 124) add a lot of latency in the propagation of the start of frame pulse from the USB host controller 110 to the real-time peripheral device. If a hub must be used between the peripheral device and the root hub 111, it is recommended that some type of compensation be added to the time after event value. The problem is that the amount of time that needs to be added to compensate for the latency of the extra USB hub is only an estimate of how the USB hub is going to perform.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. In a computer system having a processor coupled to a bus, a computer readable memory unit coupled to said bus, a Universal Serial Bus (USB) host controller generating start of frame pulses and coupled to said bus, and a peripheral device coupled to said USB host controller, a method for temporally determining a real-time event within said peripheral device comprising the steps of:

a) responsive to an event occurring within said peripheral device, initiating a first timer counting until a next start of frame pulse is detected and holding the count of said first timer;

b) responsive to said next start of frame pulse, initiating counting of a second timer;

c) after said next start of frame pulse, said USB host controller interrogating said peripheral device to determine whether an event occurred within said peripheral device;

d) provided an event is determined at step c), obtaining said count of said first timer and reading a current count of said second timer;

e) summing said counts of said first timer and said second timer to determine a third count value, said third count value representing a period of time from said event occurring to a time at which said second timer was read; and f) recording said third count value into said computer readable memory unit.

2. A method as described in claim 1 further comprising the step of transferring said third count value to a real-time software application running on said computer system.

3. A method as described in claim 1 wherein said first timer is located within said peripheral device.

4. A method as described in claim 3 wherein said second timer is located within said USB host controller.

5. A method as described in claim 4 wherein said first timer includes a 16 bit register and wherein said second timer includes a 16 bit register.

6. A method as described in claim 1 wherein said step c) comprises the steps of:

c1) said peripheral device reporting a first code to said USB host controller indicating whether or not an event occurred therein since the last start of frame pulse; and c2) said peripheral device reporting a second code to said USB host controller indicating said count held in said first timer.

7. A method as described in claim 1 wherein said steps d) through f) are performed by said processor.

8. A method as described in claim 1 wherein said peripheral device is an aiming device and wherein said event is said aiming device detecting a light pulse.

9. In a computer system having a processor coupled to a bus, a computer readable memory unit coupled to said bus, a Universal Serial Bus (USB) host controller coupled to said bus, and a peripheral device coupled to said USB host controller, a method for temporally determining a real-time event within said peripheral device comprising the steps of:

a) responsive to an event occurring within said peripheral device, initiating a first timer counting until a next start of frame pulse is detected and holding the count of said first timer;

b) responsive to said next start of frame pulse, initiating a second timer counting;

c) after said next start of frame pulse, said USB host controller interrogating said peripheral device to determine whether an event occurred within said peripheral device;

d) provided an event is determined at step c), said USB host controller generating an interrupt to said processor;

e) responsive to said interrupt, said processor obtaining said count of said first timer and reading a current count of said second timer; and f) said processor summing said counts of said first timer and said second timer to determine a third count value, said third count value representing a period of time from said event occurring in said peripheral device to the time at which said second timer was last read.

10. A method as described in claim 9 wherein said computer system further includes a graphic controller and a display device having a scanning beam, and wherein said peripheral device is an aiming device and said event is said aiming device detecting said scanning beam, said method further comprising the steps of:

determining a current position of said scanning beam from said graphics controller; and determining a position of said scanning beam when said event occurred using said third count value and said current position of said scanning beam.

11. A method as described in claim 10 wherein said first timer is located within said peripheral device.

12. A method as described in claim 11 wherein said second timer is located within said USB host controller.

13. A method as described in claim 12 wherein said first timer includes a 16 bit register and wherein said second timer includes a 16 bit register.

14. A method as described in claim 10 wherein said step c) comprises the steps of:

c1) said peripheral device reporting a first code to said USB host controller indicating whether or not an event occurred therein since a last start of frame pulse; and c2) said peripheral device reporting a second code to said USB host controller indicating said count held in said first timer.

15. A computer system comprising:

a host processor coupled to a bus;

a computer readable memory unit coupled to said bus;

a Universal Serial Bus (USB) host controller coupled to said bus and for generating start of frame pulses;

an aiming device coupled to said USB host controller; and a display device having a scanning beam;

said aiming device having a first timer for counting a period from when said aiming device detects a light pulse emitted from said scanning beam to a next start of frame pulse;

said USB host controller having a second timer for counting a period of time starting from when said next start of frame pulse occurs;

wherein said USB host controller is also for polling said aiming device after said next start of frame pulse to determine if said aiming device detected a light pulse within a last start of frame pulse and for informing said host processor thereof; and wherein said host processor is for determining a time period since said aiming device detected said light pulse emitted from said scanning beam by summing a first count value from said first timer with a second count value from said second timer to obtain a third count value.

16. A computer system as described in claim 15 wherein said host processor is also for reading a current position of said scanning beam from said graphics controller and determining a position of said scanning beam when said aiming device detected said light pulse emitted from said scanning beam by using said third count value and said current position of said scanning beam.

17. A computer system as described in claim 15 wherein said first timer includes a 16 bit register and wherein said second timer includes a 16 bit register.

18. A computer system as described in claim 15 wherein said USB host controller informs said host processor that said aiming device detected said light pulse by generating an interrupt to said host processor.

19. A computer system as described in claim 15 wherein responsive to said polling of said USB host controller, said aiming peripheral reports a first code to said USB host controller indicating whether or not said aiming device detected said light pulse emitted from said scanning beam since said last start of frame pulse and also reports a second code to said USB host controller indicating a held count of said first timer.

* * * * *